May 6, 1952        W. H. SMILA        2,595,818
OVERLOAD RELEASE COUPLING
Filed April 17, 1948
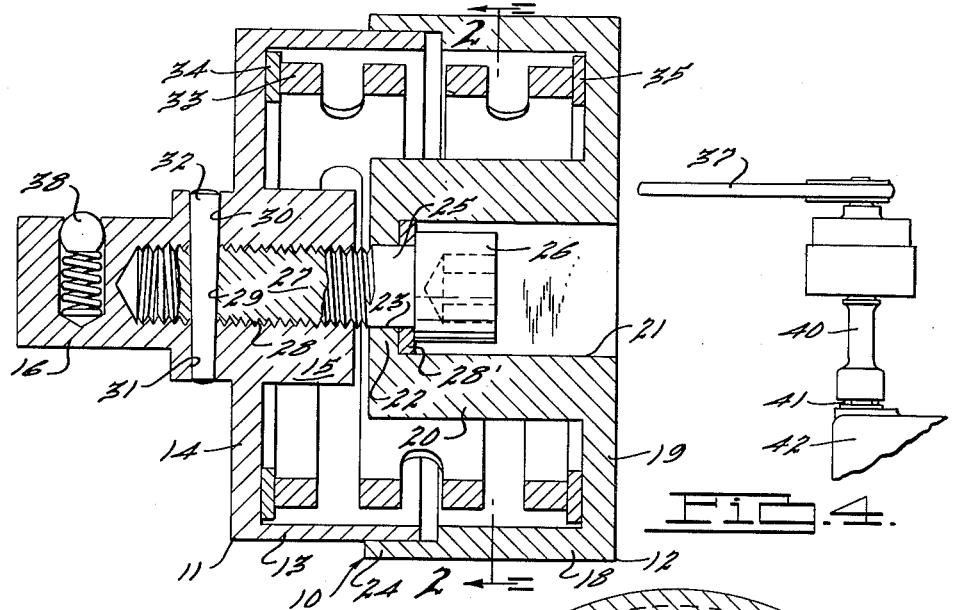
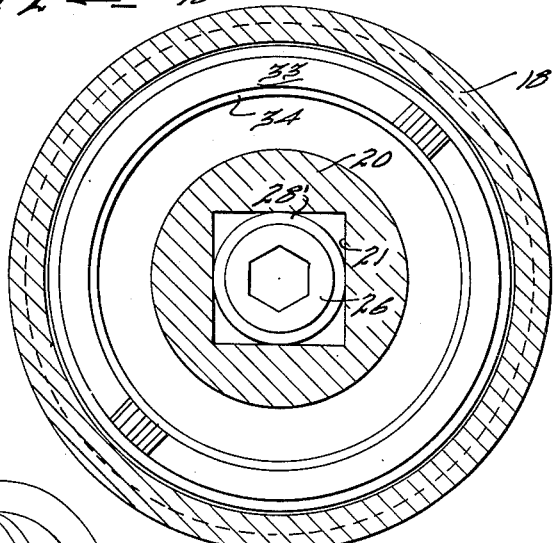
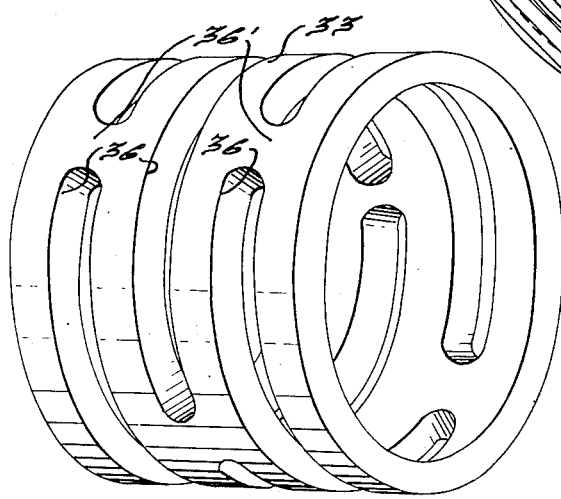
INVENTOR.
Wallace H. Smila
BY
Harness and Harris
ATTORNEYS.

Patented May 6, 1952

2,595,818

UNITED STATES PATENT OFFICE 2,595,818

OVERLOAD RELEASE COUPLING

Wallace H. Smila, Detroit, Mich., assignor to Chrysler Corporation, Highland Park, Mich., a corporation of Delaware Application April 17, 1948, Serial No. 21,600

5 Claims. (Cl. 64—30)

My invention relates to an improved torque limiting driving connection, hereinafter called a torque adaptor, and more particularly to a driving connection of this kind for torque wrenches.

In the past the torque adaptor generally used with power-driven tools and wrenches was the type known as the jaw clutch. The opposed teeth of the jaw clutch, after a certain amount of operation, would wear down to the point where the clutch failed to transmit to the tool the desired torque due to its inability to remain engaged under the torque desired. As a result, the torque applied by the wrench when the jaw clutch was the torque determining element was uncertain. Frequent replacement of clutch elements was required.

Other types of torque adaptors have also been used in the past but such use has been accompanied by the requirement of constant attention by the operator. Such adaptors are of the type that embody gauges, meters and the like for indicating the torque applied and which require action on the part of the operator as soon as the predetermined torque is reached. These types of adaptors are unfit for use on power-driven machines of the order used on high production lines because of the attention required of the operator and are generally unsatisfactory for use with wrenches because of the tendency of the operator to apply more torque once the predetermined torque has been indicated.

It is a primary object of my invention to provide a torque adaptor of the type which will automatically cease applying torque when a predetermined torque has been reached.

It is another object of my invention to provide a torque adaptor of the type which is readily adapted for use on power-driven tools and machines, as well as manually operated wrenches and other tools.

Another object of my invention is to provide a torque adaptor of the type which may be set to a predetermined torque and then locked in this position so that it will not be varied by operation and cannot be varied by the operator.

A further object of my invention is to provide a torque adaptor which may be advantageously used in numerous devices in place of shear pins.

Other objects and advantages of my invention will become more apparent from the following description taken in connection with the accompanying drawings in which:

Fig. 1 is a sectional view of my improved torque adaptor.

Fig. 2 is a transverse sectional view taken on the line 2—2 of Fig. 1.

Fig. 3 is a perspective view of the spring embodied in my improved torque adaptor.

Fig. 4 is an elevational view diagrammatically illustrating my improved torque adaptor in one of its practical applications.

Referring now to the drawings, I have shown a cylindrical torque adaptor, generally designated by the numeral 10, including two axially shiftable inner and outer cups 11 and 12, respectively. The inner cup 11 is provided with a cylindrical wall portion 13 and an end wall 14 which is integrally connected to a cylindrical boss member 15 having an axis coincident with the axis of the casing 10. The boss member 15 is provided with an outwardly extending projection 16 of rectangular cross section which is adapted to be received within a socket of a tool or other device. The cup 12 is provided with a cylindrical wall portion 18 of a relatively greater thickness than the wall portion 13 of the cup 11, having an end wall 19 integrally connected thereto. The end wall 19 is also integrally connected to an inwardly extending cylindrical boss 20 which extends axially of the casing. The boss 20 is provided with a rectangular recess 21 forming an inner wall 22 which is provided with an aperture 23. The wall 18 of the cup 12 is provided with a reduced portion 24 adjacent the open end thereof to receive the open end of the cylindrical wall 13 of the cup 11. The cups 11 and 12 are retained in this position, as clearly shown in Fig. 1, by a screw 25 having a socket head 26 and a threaded shank portion 27. The head 26 is spaced from the wall 22 of the recess 21 by a washer 28' which engages the inner wall 22 adjacent the aperture 23. The threaded shank portion 27 is received within a threaded aperture 28 in the boss 15. The axis of the screw 25 when positioned within the aperture 28 is coincident with the axis of the cups 11 and 12. The threaded shank portion 27 of screw 25 may be rotated within the aperture 28 until the shank portion 27 has entered the threaded aperture 28 a predetermined distance. At this predetermined distance a hole 29 in the threaded shank portion 27 of the screw is aligned with holes 30 and 31 in the boss member 15. A tapered pin 32, disposed within the holes 20, 29, and 31, holds the screw 25 at this predetermined position by holding the screw against rotation in either direction.

A spring 33 of circular cross section is disposed within the casing 10 and is adapted to be compressed between the inner faces of the walls 14 and 19 of the cups 11 and 12, respectively, and to exert compressive forces against the walls 14 and 19 to urge the cups 11 and 12 axially outwardly with respect to each other. The opposed extremities of the spring 33 engage flat metal friction rings 34 and 35 which in turn engage the inner faces of the walls 14 and 19, respectively.

The spring 33 is of a generally cylindrical contour and is provided with spaced rows of circumferentially aligned slots 36, the slots of each row being separated by relatively narrow bridges 36'. The bridges 36' of adjacent rows are offset 90° circumferentially relative to each other so that relative axial movement between portions of the spring may be accommodated. A spring of this type is very taut and, therefore, a relatively larger amount of pressure is required to compress the spring than to compress ordinary conventional helical springs. As a result, the distance that the spring 33 is compressed within the casing 10 to produce a large force is relatively small.

It may be readily seen that, if the inner cup 11 is rotated about its axis, its rotation is transmitted to the outer cup 12 through the spring 33. Since the spring 33 maintains a constant pressure between the cups 11 and 12, the outer cup 12 will rotate with the inner cup as long as the outer cup does not meet a sufficient resistance to overcome the friction between the rings 34 and 35 and the ends of the spring 33 which is produced by the pressure of the spring. If the ends of the spring 33 and the rings 34 and 35 become fixed together for any reason, slippage may take place between the rings 34 and 35 and the walls 14 and 19, respectively. For example, if the outer cup 12 is utilized to transmit a torque not in excess of a predetermined value to any device and operation of the device is excessively resisted and torque is applied to the inner cup in an effort to rotate it against such resistance, the inner cup will slip relative to the outer cup. This slippage may take place at either end of the spring or at both ends of it. At this time, the inner cup will slip relative to the outer cup since the pressure exerted between the cups by the spring is not sufficient to communicate the movement of one cup to the other after the predetermined torque has been reached. The size and shape, plus the amount of compression of the spring 33, are the main determining factors of this predetermined torque. The rings 34 and 35 are preferably formed of metal which wears more readily than the metal of the spring or cup walls 14 and 19 and, thus, any wear which takes place occurs mainly in the rings which are readily replaceable. A combination of brass rings and steel spring and casing will function in this way.

The thickness of the washer 28' may be predetermined to predetermine the torque of the adaptor. A thick washer will increase the predetermined torque while a thin washer will decrease the torque. The washer 28' may be removed and replaced with a washer of greater thickness to make up for the wear on the rings 34 and 35. The washer 38' is not conveniently removable by the operator and, therefore, the predetermined torque may not be changed by changing the washer 28' without dismantling the adaptor.

In Fig. 4 I have shown a typical assembly in which my improved torque adaptor may be employed. A socket of a wrench 37 receives the projection 16 of the inner cup 11 which is retained therein by a conventional ball and spring detent assembly 38, as more clearly shown in Fig. 1. Although the projection 16 is shown employing a ball and spring detent assembly, it should be understood that any type of means may be employed for this purpose. One extremity of a wrench extension 40 is received within the recess 21 of the outer cup 12 and the other extremity of the wrench extension is provided with a socket for receiving the head of a screw 41 to be threaded into a housing 42. By this construction, the screw 41 may be threaded into the housing 42 by rotating the wrench 37 about the axis of the cups 11 and 12. As the screw 41 tightens within the housing 42, more and more torque is required to rotate the screw 41. When the torque needed to rotate the screw 41 is equal to the aforementioned predetermined torque, the inner cup 11 will continue to rotate with the wrench but since the pressure created by the spring 33 has been overcome by the resistance offered by the outer cup 12 which is directly connected to the screw 41, the outer cup 12 will remain stationary and the inner cup will slip relative thereto. This slipping action is readily facilitated by the rings 34 and 35.

The torque adaptor, as herein disclosed, is especially adaptable for use with power-driven machines, tools and such devices. For example, if the manual wrench extension 37, shown in Fig. 4, were replaced by a power-driven wrench, screws such as 41 may be threaded into housings such as 42 in a very rapid fashion. The application of a power-driven wrench is readily accommodated for when the predetermined torque of the adaptor 10 has been reached, the inner cup 11 will slip relative to the outer cup 12 and the screw being operated on is no longer rotated. As a result, failure by the operator of the power-driven wrench to shut it off at the instant the screw has been tightened sufficiently will not result in stripping the threads of the screw since the screw is not tightened further after a safe predetermined torque has been reached.

My improved torque adaptors may be employed with multiple power-driven wrenches that are adapted to be operated simultaneously by one operator. It would not be necessary for the operator to use any more than one switch to control all of the wrenches since, as each torque adaptor reaches its predetermined torque, it will slip until the rest of the adaptors reach their torques, at which time the operator may discontinue operation of all of the wrenches at once.

It should be readily seen that, although I have described the inner cup 11 as the member that is directly rotated by either a manual or power-driven means and the outer cup 12 as the member that discontinues to operate when the predetermined torque has been reached, either cup may be rotated by a manual or power-driven means and either may be employed to operate a tool until a predetermined torque is applied thereon.

I claim:

1. Mechanism for limiting the application of torque between a driving element and a driven element comprising relatively axially shiftable telescoping inner and outer cups, one of said cups having a projection extending outwardly therefrom for operative connection to one of said elements and the other of said cups having a recess therein for operative connection to the other of said elements, resilient means compressed within said cups and operatively frictionally connected with each of said cups, respectively, to transmit a limited torque between said cups by said frictional connections, and means for limiting relative separatory movement of said cups comprising a member fixed to one of said cups and having an enlarged end portion disposed within said recess, and a replaceable spacing member of selected thickness disposed between said enlarged end portion and a wall of said recess and adapted to predetermine the force of friction applied by said resilient means and, accordingly, the maximum torque applied by said driving element on said driven element.

2. Mechanism for limiting the application of torque between driving and driven elements comprising first and second axially shiftable telescoping cups each being adapted to be connected to one of said elements, a device for limiting separatory movement of said cups consisting of means extending axially through said cups and fixed to one of said cups, and resilient means compressed within said cups and operatively frictionally connecting said cups to transmit a limited predetermined torque between them.

3. Mechanism for limiting the application of torque between driving and driven elements comprising first and second axially shiftable telescoping cups each being adapted to be connected to one of said elements, a device for limiting separatory movement of said cups consisting of means extending axially through said cups and fixed to one of said cups, resilient means compressed within said cups and operatively frictionally connecting said cups to transmit a limited predetermined torque between them and a replaceable spacing member of selected thickness disposed between a portion of said device and one of said cups for determining said predetermined torque.

4. Mechanism for limiting the application of torque between driving and driven elements comprising first and second axially shiftable telescoping cups each being adapted to be connected to one of said elements, a device for limiting separatory movement of said cups consisting of means extending axially through said cups and fixed to one of said cups, and resilient means compressed within said cups and operatively frictionally connecting said cups to transmit a limited predetermined torque between them, said resilient means comprising a cylindrical sleeve provided with spaced rows of circumferentially aligned slots and bridges of adjacent rows being offset circumferentially relative to each other to accommodate relative axial movement between portions of said sleeve in response to compression of said sleeve between said cups.

5. Mechanism for limiting the application of torque between driving and driven elements comprising first and second axially shiftable telescoping cups each being adapted to be connected to one of said elements, a device for limiting separatory movement of said cups consisting of means extending axially through said cups and fixed to one of said cups, resilient means compressed within said cups and operatively frictionally connecting said cups to transmit a limited predetermined torque between them, said resilient means comprising a cylindrical sleeve provided with spaced rows of circumferentially aligned slots and bridges of adjacent rows being offset circumferentially relative to each other to accommodate relative axial movement between portions of said sleeve in response to compression of said sleeve between said cups and a replaceable spacing member of selected thickness disposed between a portion of said device and one of said cups for determining said predetermined torque.

WALLACE H. SMILA.

REFERENCES CITED

The following references are of record in the file of this patent:

UNITED STATES PATENTS

| Number | Name | Date |
|---|---|---|
| 326,941 | Browne | Sept. 29, 1885 |
| 1,138,926 | Bernett | May 11, 1915 |
| 2,335,574 | Thompson et al. | Nov. 30, 1943 |

FOREIGN PATENTS

| Number | Country | Date |
|---|---|---|
| 90,138 | Switzerland | Nov. 30, 1943 |
| 505,295 | Germany | 1930 |